(12) United States Patent
Kobata

(10) Patent No.: US 10,968,304 B2
(45) Date of Patent: Apr. 6, 2021

(54) POLYMER COMPOSITION CONTAINING MODIFIED CHLORINATED POLYOLEFIN AND METHOD FOR PRODUCING SAME

(71) Applicant: KANSAI PAINT CO., LTD., Hyogo (JP)

(72) Inventor: Masami Kobata, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 16/488,483

(22) PCT Filed: Feb. 15, 2018

(86) PCT No.: PCT/JP2018/005329
§ 371 (c)(1),
(2) Date: Aug. 23, 2019

(87) PCT Pub. No.: WO2018/155309
PCT Pub. Date: Aug. 30, 2018

(65) Prior Publication Data
US 2020/0247929 A1    Aug. 6, 2020

(30) Foreign Application Priority Data

Feb. 24, 2017 (JP) .............................. JP2017-033528
Mar. 3, 2017 (JP) .............................. JP2017-041150
Nov. 20, 2017 (JP) .............................. JP2017-222648

(51) Int. Cl.
| | |
|---|---|
| C08F 212/08 | (2006.01) |
| C08F 255/02 | (2006.01) |
| C08L 23/28 | (2006.01) |
| C09D 151/00 | (2006.01) |
| C08F 216/14 | (2006.01) |
| C08F 220/18 | (2006.01) |
| C08F 220/04 | (2006.01) |
| C08F 216/02 | (2006.01) |

(52) U.S. Cl.
CPC ........ C08F 255/023 (2013.01); C08F 212/08 (2013.01); C08F 216/02 (2013.01); C08F 216/1425 (2020.02); C08F 220/04 (2013.01); C08F 220/18 (2013.01); C08L 23/286 (2013.01); C09D 151/003 (2013.01); C08L 2203/16 (2013.01); C08L 2312/00 (2013.01)

(58) Field of Classification Search
CPC ... C08F 216/02; C08F 255/023; C08L 23/286
See application file for complete search history.

(56) References Cited

U.S. PATENT DOCUMENTS

| | | |
|---|---|---|
| 5,234,524 A | 8/1993 | Ozu et al. |
| 6,861,471 B2 | 3/2005 | Masuda et al. |
| 2004/0147684 A1 | 7/2004 | Masuda et al. |
| 2005/0142362 A1* | 6/2005 | Inaoka .................. C08J 7/0427 |
| | | 428/411.1 |

FOREIGN PATENT DOCUMENTS

| | | | |
|---|---|---|---|
| JP | S5996136 A | | 6/1984 |
| JP | H04161334 A | | 6/1992 |
| JP | 06199918 A | * | 7/1994 |
| JP | H06199918 A | | 7/1994 |
| JP | H0859757 A | | 3/1996 |
| JP | 2002309161 A | | 10/2002 |
| JP | 2015003991 A | | 1/2015 |
| JP | 2015-059182 A | | 3/2015 |

OTHER PUBLICATIONS

International Search Report for PCT/JP2018/005329 dated May 15, 2018.
English Abstract Provided for JPH06199918, Publication Date: Jul. 19, 1994.
English Abstract Provided for JPH0859757, Publication Date: Mar. 5, 1996.
English Abstract Provided for JPS5996136, Publication Date: Jun. 2, 1984.
English Abstract Provided for JP2015059182, Publication Date: Mar. 30, 2015.
English Abstract Provided for JP2015003991, Publication Date: Jan. 8, 2015.

* cited by examiner

*Primary Examiner* — Mark S Kaucher
(74) *Attorney, Agent, or Firm* — Millen White Zelano and Branigan, PC; John Sopp

(57) ABSTRACT

Provided are: a method for producing a polymer composition containing a modified chlorinated polyolefin, which exhibits excellent production stability; and a coating material which contains a polymer composition containing a modified chlorinated polyolefin. According to the present invention, a polymer composition containing a modified chlorinated polyolefin is obtained by copolymerizing polymerizable monomers including (b) a chlorinated polyolefin having an allyloxy group and (c) one or more compounds selected from among (meth)acrylic acid esters, (meth)acrylic acids and styrene in the coexistence of (a) a compound having an allyloxy group and a hydroxyl group.

7 Claims, No Drawings

POLYMER COMPOSITION CONTAINING MODIFIED CHLORINATED POLYOLEFIN AND METHOD FOR PRODUCING SAME

FIELD

The present invention relates to a polymer composition containing a modified chlorinated polyolefin, and to a method for producing it, as well as to a coating composition containing the composition.

BACKGROUND

Plastic materials are currently being used in a variety of different industrial fields, among which polyolefin-based resins such as polypropylene resins, being materials with numerous excellent properties and low cost, are widely used as base materials for molded articles and films. However, because polyolefin-based base materials have low polarity, their adhesion is inferior for coating films formed during coating, and therefore when coating onto plastic substrates such as polyolefins, a composition containing a modified chlorinated polyolefin such as an acryl-modified chlorinated polyolefin is used as a coating material or primer in order to achieve both adhesion with polyolefin-based base materials and compatibility with other resin components that are used in combination.

Conventional methods for obtaining compositions containing such modified chlorinated polyolefins have been disclosed, such as methods in which a hydroxyl-containing polymerizable unsaturated monomer is reacted with a chlorinated polyolefin that has an acid anhydride group, to introduce a polymerizable unsaturated group, and the polymerizable unsaturated monomer is polymerized with the polymerizable unsaturated group (PTL 1 and PTL 2).

However, this prior art has been problematic because the production stability is sometimes inadequate.

PTL 3 describes, as a method for improving production stability, a method for producing a modified chlorinated polyolefin resin composition in which a chlorinated polyolefin that has an acid anhydride group is modified using a hydroxyl group-containing (meth)acrylic acid ester and an alcohol, and a polymerizable vinyl-based monomer is copolymerized in an organic solvent in the presence of the obtained esterified chlorinated polyolefin. However, modified chlorinated polyolefin resin compositions obtained by this production method have sometimes had insufficient curability in compositions used in combination with crosslinking agents that are reactive with hydroxyl groups. In addition, the production stability has sometimes been insufficient with this production method as well.

CITATION LIST

Patent Literature

[PTL 1] Japanese Unexamined Patent Publication No. H08-59757
[PTL 2] Japanese Unexamined Patent Publication No. 2002-309161
[PTL 3] Japanese Unexamined Patent Publication No. 2015-3991

SUMMARY

Technical Problem

It is an object of the invention to provide a method for obtaining a polymer composition containing a modified chlorinated polyolefin, the method having excellent production stability. It is an object of one aspect of the invention to provide a method for obtaining a polymer composition containing a modified chlorinated polyolefin, whereby it is possible to obtain a composition with excellent curability when used in combination with a hydroxyl group-reactive crosslinking agent.

Solution to Problem

Specifically, according to the present invention, a polymerizable monomer such as an acrylic monomer is copolymerized with a chlorinated polyolefin that has an allyloxy group, in the co-presence of a compound that has an allyloxy group and a hydroxyl group, to obtain a polymer composition containing a modified chlorinated polyolefin.

Advantageous Effects of Invention

It has been found that production stability is excellent when a polymerizable monomer such as an acrylic monomer is copolymerized with a chlorinated polyolefin that has an allyloxy group, in the co-presence of a compound that has an allyloxy group and a hydroxyl group, to obtain a polymer composition containing a modified chlorinated polyolefin, in the manner of the invention. It has also been found that if a polymer composition containing a modified chlorinated polyolefin produced by the production method of the invention is used in combination with a hydroxyl group-reactive crosslinking agent, it is possible to obtain a composition with excellent curability.

DESCRIPTION OF EMBODIMENTS

Modes for carrying out the invention will now be explained in detail.

[Compound Having an Allyloxy Group and a Hydroxyl Group (a)]

According to the invention, a chlorinated polyolefin that has an allyloxy group (b), and a polymerizable monomer including one or more compounds (c) selected from the group consisting of (meth)acrylic acid esters, (meth)acrylic acid and styrene, are copolymerized in the co-presence of a compound that has an allyloxy group and a hydroxyl group (a). The compound that has an allyloxy group and a hydroxyl group (a), to be used for the invention, has an allyloxy group and a hydroxyl group in the molecule, and examples include compounds represented by formula (I):

[Chemical Formula 1]

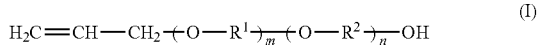

(I)

(where $R^1$ and $R^2$ each independently represent an alkylene group of 2 or 3 carbon atoms that is optionally branched, m and n each independently represent a real number of 0 to 50, the sum of m and n being a real number of 1 or greater, and the structure may be a block structure or random structure);

adducts of allyl alcohols and lactone; and adducts of compounds represented by formula (I) and lactone. Compounds represented by formula (I) are easily obtainable and are preferred. Specific examples of compounds included in formula (I) are allyloxyethanols, ethyleneglycol monoallyl ethers and diethyleneglycol monoallyl ethers, examples of which include 2-allyloxyethanol (alternate name: ethyleneglycol monoallyl ether), diethyleneglycol monoallyl ether, 1-allyloxy-2-propanol (alternate name: propyleneglycol monoallyl ether, dipropyleneglycol monoallyl ether, polyethyleneglycol monoallyl ether, polypropyleneglycol monoallyl ether, polypropylene glycol (2-allyloxyethyl) ether, allyl alcohols and addition reaction products of ethylene oxide and propylene oxide. Of these it is particularly preferable to use 2-allyloxyethanol (alternate name: ethyleneglycol monoallyl ether) and diethyleneglycol monoallyl ether. Allyloxyethanols are preferred since they are industrially available.

The method used to produce a compound represented by formula (I) may be a publicly known method, and for example, the compound can be obtained by reacting ethylene oxide and/or propylene oxide with an allyl alcohol, or by reacting one or more selected from among ethylene glycol, diethylene glycol, propylene glycol, dipropylene glycol, polyethylene glycol and polypropylene glycol with an allyl chloride or allyl alcohol. A basic compound or acidic compound may also be added if necessary for the reaction, with such compounds being neutralized or removed upon completion of the reaction.

[Chlorinated Polyolefin Having an Allyloxy Group (b)]

The chlorinated polyolefin that has an allyloxy group (b) can be obtained by modifying a chlorinated polyolefin with a compound having an allyloxy group, to introduce the allyloxy group. The method of introducing the allyloxy group into the chlorinated polyolefin may be, specifically, a method of reacting a chlorinated polyolefin that has an acid group with a compound that has an allyloxy group and a hydroxyl group, to add the compound that has an allyloxy group and a hydroxyl group to the chlorinated polyolefin by ester condensation reaction between the acid group and the hydroxyl group, or a method of reacting a compound that has an allyloxy group and a hydroxyl group with a chlorinated polyolefin that has an acid anhydride group (d), to add the compound that has an allyloxy group and a hydroxyl group to the chlorinated polyolefin by addition reaction between the acid anhydride group and the hydroxyl group.

The chlorinated polyolefin that has an acid group is preferably one obtained by modifying a polyolefin with an organic carboxylic acid such as maleic acid or itaconic acid to introduce an acid group and then carrying out chlorination, or one in which a chlorinated polyolefin obtained by chlorination of a polyolefin, has been modified with an organic carboxylic acid such as maleic acid or itaconic acid to introduce an acid group, where the modification or chlorination is carried out by a known method. A chlorinated polyolefin that has an acid anhydride group (d) is preferably one obtained by modifying a polyolefin with an anhydride of an organic carboxylic acid such as maleic acid or itaconic acid to introduce an acid anhydride group and then carrying out chlorination, or one in which a chlorinated polyolefin obtained by chlorination of a polyolefin, is modified with an anhydride of an organic carboxylic acid such as maleic acid or itaconic acid to introduce an acid anhydride group, where the modification or chlorination is carried out by a known method. The polyolefin starting material is not particularly restricted, and for example, it may be one obtained by homopolymerization or copolymerization of one or more selected from among α-olefins of 2 to 10 carbon atoms such as ethylene, propylene, 1-butene and 1-octene, or one obtained by copolymerization of an α-olefin with another polymerizable monomer such as vinyl acetate. A Ziegler-Natta catalyst, metallocene-based catalyst and/or radical generator may be used for the polymerization, and the form of polymerization may be one-step polymerization or multistage polymerization, or even reactor rubbery polymerization. These polyolefins may also be used in admixture as starting materials, in order to adjust the compatibility, crystallinity, hardness, liquid stability or adhesion. Examples that may be used for the chlorinated polyolefin that has an acid anhydride group (d) include the commercial products "SUPERCHLON 892L", "SUPERCHLON 892LS", "SUPERCHLON 822", "SUPERCHLON 822S", "SUPERCHLON 930", "SUPERCHLON 930S", "SUPERCHLON 842LM", "SUPERCHLON 851L", "SUPERCHLON 3228S", "SUPERCHLON 3221S" and "SUPERCHLON 2319S" (trade names of Nippon Paper Group, Inc., maleic anhydride-modified chlorinated polyolefins), and "HARDLEN CY-9122P", "HARDLEN CY-9124P", "HARDLEN HM-21P", "HARDLEN CY-1321P", "HARDLEN CY-2121P", "HARDLEN CY-2129P", "HARDLEN F-225P", "HARDLEN F-7P", "HARDLEN M-28P", "HARDLEN F-2P", "HARDLEN F-6P" and "HARDLEN CY-1132" (trade names of Toyobo, Ltd., maleic anhydride-modified chlorinated polyolefins). These may be in the form of solution products or solid products. Any of the aforementioned compounds for the chlorinated polyolefin that has an acid anhydride group (d) may be used alone, or in combinations of two or more, for adjustment of the compatibility, crystallinity, hardness, liquid stability or adhesion. The chlorine content of the chlorinated polyolefin that has an acid anhydride group (d) is preferably 10 to 35 mass %.

The production method of the invention has high production stability even with a relatively high chlorine content of the chlorinated polyolefin that has an acid anhydride group (d). Therefore, the production method of the invention is particularly suitable for use when the chlorine content of the chlorinated polyolefin that has an acid anhydride group (d) is in the range of 10 to 35 mass %, preferably 19 to 32 mass % and more preferably 20 to 28 mass %. If the chlorine content is greater than 35 mass % the adhesion on plastic substrates may be reduced, and if it is less than 10% the solution stability may be reduced, and therefore both are undesirable.

The amount of acid anhydride introduced into the chlorinated polyolefin that has an acid anhydride group (d) is preferably 0.1 to 8 parts by mass and more preferably 0.5 to 3 parts by mass, with respect to 100 parts by mass of the chlorinated polyolefin that has an acid anhydride group (d). If the amount of acid anhydride groups introduced is less than 0.1 part by mass the adhesion between layers may be reduced when it is used in a multilayer coating film, and if it is greater than 8 parts by mass the adhesion onto plastic substrates may be reduced.

When the compound that has an allyloxy group and a hydroxyl group is reacted with the chlorinated polyolefin that has an acid anhydride group (d), the compound that has an allyloxy group and a hydroxyl group is added to the acid anhydride group, allowing a chlorinated polyolefin that has an allyloxy group (b) to be obtained. A compound that has an allyloxy group and a hydroxyl group (a) which is represented by formula (I) above, for example, may be used as the compound that has an allyloxy group and a hydroxyl group.

The amount of the compound that has an allyloxy group and a hydroxyl group to be used for reaction with the chlorinated polyolefin that has an acid anhydride group (d) is preferably in the range of 0.2 to 300 mol and more preferably in the range of 0.5 to 150 mol, with respect to 1 mol of the acid anhydride group. If the amount of the compound that has an allyloxy group and a hydroxyl group is less than 0.2 mol the curability of the polymer composition containing a modified chlorinated polyolefin may be reduced, and if it is greater than 300 mol, the amount of the unreacted compound that has an allyloxy group and a hydroxyl group, which is partially remaining after copolymerization, will be excessively increased, potentially lowering the stability of the polymer composition containing a modified chlorinated polyolefin.

Reaction between the chlorinated polyolefin that has an acid anhydride group (d) and the compound that has an allyloxy group and a hydroxyl group is not particularly restricted, and it may be carried out by a common method for reacting acid anhydride groups and hydroxyl groups. As a specific example, it may be carried out by a method in which the chlorinated polyolefin that has an acid anhydride group (d) and the compound that has an allyloxy group and a hydroxyl group are heated at about 20 to 160° C., preferably about 60 to 120° C. and even more preferably about 80 to 110° C., for about 0.5 to 72 hours. For accelerated progress of the reaction, the reaction may be carried out at high temperature, and a low temperature maintained thereafter.

A catalyst may also be used during the reaction to accelerate the reaction. Examples of catalysts to be used include known catalysts, including Lewis acid metal compounds such as dibutyltin oxide, dibutyltin dilaurate, antimony trioxide, zinc acetate, manganese acetate, cobalt acetate, calcium acetate, lead acetate, tetrabutyl titanate and tetraisopropyl titanate; onium salts such as tetrabutylammonium bromide and tetraphenylphosphonium chloride; and basic nitrogen-containing compounds such as triethylamine and triazole.

A polymerization inhibitor may also be used during the reaction. Examples of polymerization inhibitors to be used include known polymerization inhibitors, including phenolic hydroxyl-containing compounds such as di-t-butylhydroxytoluene and methoxyphenol; carbonyl group-containing aromatic compounds such as benzoquinone, nitroso backbone-containing compounds; and N-oxyl backbone-containing compounds.

When the chlorinated polyolefin that has an allyloxy group (b) is obtained by addition reaction of a compound that has an allyloxy group and a hydroxyl group (a) represented by formula (I), with a chlorinated polyolefin that has an acid anhydride group (d), a hydroxyl-containing compound other than the compound that has an allyloxy group and a hydroxyl group (a) may also be added if necessary, in addition to the compound that has an allyloxy group and a hydroxyl group (a). Examples of hydroxyl-containing compounds other than the compound that has an allyloxy group and a hydroxyl group (a) include alcohols, and compounds with (meth)acryloyl groups and hydroxyl groups.

Examples of such alcohols include alkylalcohols such as methanol, ethanol, propanol, butanol and 2-ethylhexanol; ether group-containing alcohols such as ethyleneglycol monobutyl ether, propyleneglycol monopropyl ether and diethyleneglycol monomethyl ether; aromatic alcohols such as benzyl alcohol; carbonyl group-containing alcohols such as diacetone alcohol; and polyols such as diethylene glycol, tripropylene glycol, 1,6-hexanediol and trimethylolpropane.

Examples of compounds with (meth)acryloyl groups and hydroxyl groups include monoesterified products of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate or 4-hydroxybutyl (meth)acrylate; and ε-caprolactone-modified forms of monoesterified products of (meth)acrylic acid and dihydric alcohols of 2 to 8 carbon atoms.

In addition, when a compound that has an allyloxy group and a hydroxyl group (a) represented by formula (I) and a hydroxyl-containing compound other than the compound that has an allyloxy group and a hydroxyl group (a) are to be added to the chlorinated polyolefin that has an acid anhydride group (d), addition reaction of the compound that has an allyloxy group and a hydroxyl group (a) with the chlorinated polyolefin that has an acid anhydride group (d) may be followed by further addition reaction of the hydroxyl-containing compound other than the compound that has an allyloxy group and a hydroxyl group (a), or alternatively a premixture of the compound that has an allyloxy group and a hydroxyl group (a) and the hydroxyl-containing compound other than the compound that has an allyloxy group and a hydroxyl group (a) may be added to the chlorinated polyolefin that has an acid anhydride group (d) to carry out addition reaction, or yet alternatively, the hydroxyl-containing compound other than the compound that has an allyloxy group and a hydroxyl group (a) may be reacted with the chlorinated polyolefin that has an acid anhydride group (d) first, and then further addition reaction of the compound that has an allyloxy group and a hydroxyl group (a) may be carried out. When the hydroxyl-containing compound other than the compound that has an allyloxy group and a hydroxyl group (a) is to be added to the chlorinated polyolefin that has an acid anhydride group (d), the amount of the hydroxyl-containing compound other than the compound that has an allyloxy group and a hydroxyl group (a) is not particularly restricted but is preferably no greater than 500 mol and more preferably no greater than 300 mol, with respect to 1 mol of acid anhydride groups in the chlorinated polyolefin that has an acid anhydride group (d). If the amount exceeds 500 mol, the stability of the polymer composition containing a modified chlorinated polyolefin may be reduced in some cases. When the hydroxyl-containing compound other than the compound that has an allyloxy group and a hydroxyl group (a) includes a compound with a (meth)acryloyl group and a hydroxyl group, the amount of the compound with a (meth)acryloyl group and hydroxyl group is preferably no greater than 10 mol and more preferably no greater than 5 mol, with respect to 1 mol of acid anhydride groups in the chlorinated polyolefin that has an acid anhydride group (d). If the amount exceeds 10 mol, the system may tend to gel during the copolymerization process, in some cases.

[Polymerizable Monomer Including One or More Compounds (c) Selected from Among (Meth)Acrylic Acid Esters, (Meth)Acrylic Acid and Styrene]

Throughout the present specification, "(meth)acrylic acid" means "acrylic acid or methacrylic acid", "(meth)acrylic acid ester" means "acrylic acid ester or methacrylic acid ester", "(meth)acryloyl" means "acryloyl or methacryloyl", and "(meth)acrylate" means "acrylate or methacrylate". The (meth)acrylic acid ester to be used for the invention is not particularly restricted, and examples include alkyl esters of (meth)acrylic acid such as methyl (meth)acrylate, ethyl (meth)acrylate, n-propyl (meth)acrylate, i-propyl (meth)acrylate, n-butyl (meth)acrylate, butyl (meth)acrylate, t-butyl (meth)acrylate, 2-ethylhexyl (meth)acrylate, lauryl (meth)acrylate, cyclohexyl (meth)acrylate and isobornyl (meth)acrylate; hydroxy group-containing (meth)acrylic acid esters such as hydroxyethyl (meth)acrylate, hydroxypropyl (meth)acrylate and hydroxybutyl (meth)acrylate; di(meth)acrylates such as ethyleneglycol di(meth)acrylate; allyl group-containing (meth)acrylic acid esters such as allyl (meth)acrylate; epoxy group-containing (meth)acrylic acid esters such as glycidyl (meth)acrylate; and phosphate group-containing (meth)acrylic acid esters such as 2-(meth)acryloyloxy)ethyl phosphate, acid phosphoxypolyoxyethyleneglycol mono(meth)acrylate and acid phosphoxypolyoxypropyleneglycol mono(meth)acrylate. Styrenes may be substituted, in which case examples include alkyl group-substituted styrenes such as methylstyrene and ethylstyrene. These polymerizable monomers may be used alone or in combinations of two or more, for adjustment of the molecular weight, hardness, polarity, adhesion, solution viscosity, solution stability and compatibility of the polymer composition.

[Copolymerization of Polymerizable Monomer Including Chlorinated Polyolefin that Has an Allyloxy Group (b), and Compound (c), in the Co-Presence of Compound (a)]

According to the invention, a chlorinated polyolefin that has an allyloxy group (b), and a polymerizable monomer including one or more compounds (c) selected from the group consisting of (meth)acrylic acid esters, (meth)acrylic acid and styrene, are copolymerized in the co-presence of a compound that has an allyloxy group and a hydroxyl group (a), to produce a modified chlorinated polyolefin. The amount of compound (a), the chlorinated polyolefin that has an allyloxy group (b) and the polymerizable monomer including one or more compounds (c) selected from among (meth)acrylic acid esters, (meth)acrylic acid and styrene, that are used for copolymerization, are preferably in the following ranges, based on 100 parts by mass as the total solid content of components (a) to (c).

Compound that has an allyloxy group and a hydroxyl group (a): 0.05 to 40 parts by mass, preferably 0.1 to 30 parts by mass and more preferably 0.2 to 20 parts by mass, Chlorinated polyolefin that has an allyloxy group (b): 1 to 89.95 parts by mass, preferably 5 to 60 parts by mass and more preferably 10 to 35 parts by mass, One or more compounds (c) selected from among (meth) acrylic acid esters, (meth)acrylic acid and styrene: 10 to 98.95 parts by mass, preferably 35 to 95 parts by mass and more preferably 65 to 90 parts by mass.

According to the invention, when a chlorinated polyolefin that has an allyloxy group (b), and a polymerizable monomer including one or more compounds (c) selected from the group consisting of (meth)acrylic acid esters, (meth)acrylic acid and styrene, are copolymerized in the co-presence of a compound that has an allyloxy group and a hydroxyl group (a), a copolymerizing component other than a (meth)acrylic acid ester, (meth)acrylic acid or styrene may also be added. Examples of such other copolymerizing components include aliphatic vinyl carboxylates such as vinyl acetate, vinyl octanoate and vinyl decanoate. In order to adjust the molecular weight, liquid stability and compatibility of the polymer composition, copolymerization may be carried out also in the presence of one or more selected from among chlorinated polyolefins without allyloxy groups, and chlorinated polyolefins without acid anhydride groups.

According to the invention, when a chlorinated polyolefin that has an allyloxy group (b) (hereunder also referred to simply as "(b)") and a polymerizable monomer including one or more compounds (c) selected from among (meth) acrylic acid esters, (meth)acrylic acid and styrene (hereunder also referred to simply as "(c)") are to be copolymerized in the co-presence of a compound that has an allyloxy group and a hydroxyl group (a) (hereunder also referred to simply as "(a)"), any method may be employed to adjust the molecular weight, liquid stability and compatibility of the polymer composition, such as adding (b) to the reaction tank first and then conducting polymerization while adding (c); adding (b) to the reaction tank first and then conducting polymerization while adding (b) and (c); adding (b) and (c) to the reaction tank and then polymerizing them all at once; adding (b) and (c) to the reaction tank first and then conducting polymerization while adding (b); adding (b) and (c) to the reaction tank first and then conducting polymerization while adding a polymerizable monomer including compound (c); adding (b) and (c) to the reaction tank first and then conducting polymerization while adding (b) and (c); conducting polymerization while adding (b) and (c) to the reaction tank; adding (c) to the reaction tank first and then conducting polymerization while adding (b); or adding (c) to the reaction tank first and then conducting polymerization while adding (b) and (c). These methods may also be combined for the polymerization step as a multistage process. For example, a step of adding (b) and (c) to the reaction tank and polymerizing them all at once in a first stage may be combined with a step of conducting polymerization while adding (b) and/or (c) to the reaction tank in a second stage, or a step of conducting polymerization while adding (b) and (c) to the reaction tank in a first stage may be combined with a step of conducting polymerization while adding (b) and/or (c) to the reaction tank in a second stage. When the polymerization step is to be carried out in a multistage process, the compositions of (b) and/or (c) used in each of the steps may be the same or different.

When the chlorinated polyolefin that has an acid anhydride group (d) is to be mixed with the compound that has an allyloxy group and a hydroxyl group (a) for addition reaction to obtain a chlorinated polyolefin that has an allyloxy group (b), the addition reaction may be halted before completion, or the number of moles of the compound that has an allyloxy group and a hydroxyl group (a) that is to be mixed may be set to be greater than the number of moles of the acid anhydride group, to obtain a mixture of the chlorinated polyolefin that has an allyloxy group (b) with the unreacted compound that has an allyloxy group and a hydroxyl group (a). In this case, the chlorinated polyolefin that has an allyloxy group (b), and the polymerizable monomer including one or more compounds (c) selected from the group consisting of (meth)acrylic acid esters, (meth)acrylic acid and styrene, may be copolymerized in the co-presence of a compound that has an allyloxy group and a hydroxyl group (a), by copolymerizing the mixture with a polymerizable monomer that includes compound (c). When the chlorinated polyolefin that has an allyloxy group (b) is to be copolymerized with a polymerizable monomer including compound (c), the chlorinated polyolefin that has an allyloxy group (b), and the polymerizable monomer including one or more compounds (c) selected from the group consisting of (meth)acrylic acid esters, (meth)acrylic acid and styrene, can also be copolymerized in the co-presence of a compound that has an allyloxy group and a hydroxyl group (a), by first mixing the chlorinated polyolefin that has an allyloxy group (b) and the compound that has an allyloxy group and a hydroxyl group (a), or by first mixing the polymerizable monomer including compound (c), and the compound that has an allyloxy group and a hydroxyl group (a).

According to the invention, there are no particular restrictions on the method for copolymerizing the chlorinated polyolefin that has an allyloxy group (b) and the polymerizable monomer including one or more compounds (c) selected from among (meth)acrylic acid esters, (meth) acrylic acid and styrene, in the co-presence of the compound that has an allyloxy group and a hydroxyl group (a), and any known copolymerization method may be used, but a preferred method is solution polymerization in which polymerization is carried out in an organic solvent in the presence of a polymerization initiator.

Examples of organic solvents to be used in such a solution polymerization method include aromatic solvents such as toluene, xylene and "SWASOL 1000" (trade name of Cosmo Oil Co., Ltd., high-boiling-point petroleum-based solvent); alicyclic solvents such as cyclohexane and methylcyclohexane; aliphatic solvents such as hexane and heptane; esteric solvents such as ethyl acetate, butyl acetate, 3-methoxybutyl acetate, butyl propionate, ethyl-3-ethoxy propionate, ethyleneglycol monoethyl ether acetate and propyleneglycol monomethyl ether acetate; ketone-based solvents such as methyl ethyl ketone, methyl isobutyl ketone and methylpentyl ketone; and alcohol-based solvents such as butanol, 2-ethylhexanol, ethyleneglycol monobutyl ether and dipropyleneglycol monomethyl ether. Any two or more of these may also be used in admixture.

The amount of organic solvent used during the polymerization reaction is not particularly restricted, but it may be appropriately modified to adjust the stability of the polymer composition containing a modified chlorinated polyolefin. From the viewpoint of increasing production efficiency, it will usually be suitable in a range of up to 500 parts by mass, preferably 50 to 400 parts by mass and more preferably 100 to 300 parts by mass, based on 100 parts by mass as the total solid content of components (a) to (c).

The organic solvent may also be added after the copolymerization reaction. Solvent removal may also be carried out after the copolymerization reaction.

The polymerization initiator used may be a known compound, and examples include ketone peroxides such as methyl ethyl ketone peroxide and acetylacetone peroxide; peroxy ketals such as di(tert-hexylperoxy)cyclohexane and di(tert-butylperoxy)cyclohexane; hydroperoxides such as p-menthane hydroperoxide; dialkyl peroxides such as di-tert-butyl peroxide, di(2-tert-butylperoxyisopropyl)benzene and dicumyl peroxide; diacyl peroxides such as diisobutyryl peroxide, di(3,5,5-trimethylhexanoyl)peroxide and dilauroyl peroxide; peroxy dicarbonates such as di(2-ethylhexyl) peroxy dicarbonate, diisopropyl peroxydicarbonate and di(4-tert-butylcyclohexyl)peroxy dicarbonate; peroxy carbonates such as tert-butylperoxyisopropyl carbonate and tert-butylperoxy2-ethylhexyl carbonate; peroxy esters such as tert-butyl peroxypivalate, tert-butyl peroxylaurate, tert-butylperoxy-2-ethyl hexanoate, tert-butyl peroxyacetate, tert-butylperoxy benzoate, 2,5-dimethyl-2,5-di(2-ethylhexanoylperoxy)hexane and di-tert-butyl peroxyhexahydroterephthalate; azo compounds such as azobisisobutyronitrile, azobis(2,4-dimethylvaleronitrile), azobis(2-methylpropionitrile), azobis(2-methylbutyronitrile), 4,4'-azobis(4-cyanopentanoic acid), dimethylazobis(2-methyl propionate), azobis[2-methyl-N-(2-hydroxyethyl)-propionamide] and azobis{2-methyl-N-[2-(1-hydroxybutyl)]-propionamide}; and persulfuric acid salts such as potassium persulfate, ammonium persulfate and sodium persulfate. The polymerization initiator may be a monofunctional type or a polyfunctional type, in relation to the radical to be produced.

These polymerization initiators may be used alone, or they may be used in combinations of two or more. If necessary, a reducing agent such as a sugar, sodium formaldehyde sulfoxylate or an iron complex, for example, may be used with the polymerization initiator, to prepare a redox initiator.

The amount of polymerization initiator used will usually be suitable in a range of 0.1 to 10 parts by mass, preferably 0.5 to 8 parts by mass and more preferably 1 to 6 parts by mass, based on 100 parts by mass as the total solid content of components (a) to (c). The amount of polymerization initiator used may be changed to modify the molecular weight of the polymer composition containing a modified chlorinated polyolefin. A molecular weight of about 10,000 to 1,000,000, as the weight-average molecular weight, will facilitate production, while it is preferably about 30,000 to 400,000 and more preferably about 70,000 to 200,000 in order to increase the solution stability and compatibility of the polymer composition.

As used herein, the weight-average molecular weight is the value determined by converting the retention time (retention volume) using gel permeation chromatography (GPC) to polystyrene molecular weight based on the retention time (retention volume) for standard polystyrene of known molecular weight, measured under the same conditions. Specifically, it may be measured using "HLC-8120GPC" (trade name of Tosoh Corp.) as the gel permeation chromatograph, using 4 columns, a "TSKgel G4000HXL", "TSKgel G3000HXL", "TSKgel G2500HXL" and "TSKgel G2000HXL" (all trade names of Tosoh Corp.) as the columns, and using a differential refractometer as the detector, under the conditions of mobile phase: tetrahydrofuran, measuring temperature: 40° C., flow rate: 1 mL/min.

The method of adding the polymerization initiator is not particularly restricted, and it may be appropriately selected according to the type and amount used. For example, it may be mixed with the monomer mixture or solvent beforehand, or it may be added all at once or in a dropwise manner during polymerization.

The copolymerization reaction can usually be carried out in a temperature range of 20 to 170° C., preferably 70 to 130° C. and more preferably 80 to 120° C.

An antioxidant may also be added after the copolymerization reaction. Examples of antioxidants to be used include phenolic hydroxyl-containing compounds such as di-t-butyl-hydroxytoluene and methoxyphenol; and carbonyl group-containing aromatic compounds such as benzoquinone.

[Polymer Composition Containing a Modified Chlorinated Polyolefin]

A crosslinking agent may be added to the polymer composition containing a modified chlorinated polyolefin of the invention, as necessary. Any crosslinking agent may be used that can be combined with the polymer composition containing a modified chlorinated polyolefin to form a curable composition, and hydroxyl group-reactive crosslinking agents included among the aforementioned modified chlorinated polyolefins are generally suitable for use. Examples of such hydroxyl group-reactive crosslinking agents that are suitable for use include polyisocyanate compounds, blocked polyisocyanate compounds and amino resins. Such crosslinking agents may be used alone, or two or more may be used in combination.

The polyisocyanate compound is a compound with at least two isocyanate groups in the molecule, and examples include aliphatic polyisocyanates, alicyclic polyisocyanates, aromatic/aliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-dnisocyanatomethyl)-bicyclo(2.2.1)heptane, 3-(3-isocyanatopropyl)-2,5-dnisocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of aromatic/aliphatic polyisocyanates include aromatic/aliphatic diisocyanates such as methylene bis(4,1-phenylene)diisocyanate (common name: MDI), 1,3- or 1,4-xylylene diisocyanate or mixtures thereof, ω,ω-diisocyanato-1,4-diethylbenzene and 1,3- or 1,4-bis(1-isocyanato-1-methylethyl)benzene (common name: tetramethylxylylene diisocyanate) or mixtures thereof; and aromatic/aliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4''-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more. Aliphatic diisocyanates, alicyclic diisocyanates and their derivatives are preferred among these polyisocyanates.

Also, the polyisocyanate compound that is used may be a prepolymer obtained by reacting any of the aforementioned polyisocyanates and their derivatives with a compound that can react with the polyisocyanate, under conditions with an excess of isocyanate groups. Compounds that can react with the aforementioned polyisocyanates include compounds with active hydrogen groups such as hydroxyl and amino, and specifically there may be used polyhydric alcohols, low molecular weight polyester resins, amines, water and the like.

The polyisocyanate compound used may also be a polymer of an isocyanate group-containing polymerizable unsaturated monomer, or a copolymer of such an isocyanate group-containing polymerizable unsaturated monomer and a polymerizable unsaturated monomer other than the isocyanate group-containing polymerizable unsaturated monomer.

From the viewpoint of curability, the polyisocyanate compound may be used in a proportion such that the equivalent ratio of isocyanate groups in the polyisocyanate compound and hydroxyl groups in the resin component of the polymer composition containing a modified chlorinated polyolefin (NCO/OH), is in the range of usually 0.5 to 2.5 and especially 0.8 to 1.9.

The aforementioned blocked polyisocyanate compound is a compound wherein the isocyanate groups of the polyisocyanate compound are blocked with a blocking agent.

Examples of blocking agents include phenol-based compounds such as phenol, cresol, xylenol, nitrophenol, ethylphenol, hydroxydiphenyl, butylphenol, isopropylphenol, nonylphenol, octylphenol and methyl hydroxybenzoate; lactam-based compounds such as ε-caprolactam, δ-valerolactam, γ-butyrolactam and β-propiolactam; aliphatic alcohol-based compounds such as methanol, ethanol, propyl alcohol, butyl alcohol, amyl alcohol and lauryl alcohol; ether-based compounds such as ethyleneglycol monomethyl ether, ethyleneglycol monoethyl ether, ethyleneglycol monobutyl ether, diethyleneglycol monomethyl ether, diethyleneglycol monoethyl ether, propyleneglycol monomethyl ether and methoxymethanol; alcohol-based compounds such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate and 2-hydroxyethyl methacrylate; oxime-based compounds such as formamideoxime, acetamideoxime, acetooxime, methylethylketooxime, diacetylmonooxime, benzophenoneoxime and cyclohexaneoxime; malonic acid diester-based compounds with active methylene sites, such as dimethyl malonate, diethyl malonate, ethylmethyl malonate and di(2-methoxy-1-methylethyl) malonate; acetyl group-containing compounds with active methylene sites, such as ethyl acetoacetate, methyl acetoacetate and acetylacetone; mercaptane-based compounds such as butylmercaptane, t-butylmercaptane, hexylmercaptane, t-dodecylmercaptane, 2-mercaptobenzothiazole, thiophenol, methylthiophenol and ethylthiophenol; acid amide-based compounds such as acetoanilide, acetanisidide, acetotoluide, acrylamide, methacrylamide, acetic acid amide, stearic acid amide and benzamide; imide-based compounds such as succinic acid imide, phthalic acid imide and maleic acid imide; amine-based compounds such as diphenylamine, phenylnaphthylamine, xylidine, N-phenylxylidine, carbazole, aniline, naphthylamine, butylamine, dibutylamine and butylphenylamine; imidazole-based compounds such as imidazole and 2-ethylimidazole; urea-based compounds such as urea, thiourea, ethyleneurea, ethylenethiourea and diphenylurea; carbamic acid ester-based compounds such as phenyl N-phenylcarbamate; imine-based compounds such as ethyleneimine and propyleneimine; sulfite-based compounds such as sodium bisulfite and potassium bisulfite; and azole-based compounds. Azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo- 3,5-dimethylpyrazole and 3-methyl-5-phenylpyrazole; imidazole or imidazole derivatives, such as imidazole, benzimidazole, 2-methylimidazole, 2-ethylimidazole and 2-phenylimidazole; and imidazoline derivatives such as 2-methylimidazoline and 2-phenylimidazoline.

Preferred blocking agents among these include oxime-based blocking agents, malonic acid diester-based or acetyl group-containing compound-based blocking agents having active methylene sites, and pyrazole or pyrazole derivatives.

A solvent may also be added as necessary for blocking (reaction with a blocking agent). The solvent used for the blocking reaction may be any one that is not reactive with isocyanate groups, examples of which include ketones such as acetone and methyl ethyl ketone, esters such as ethyl acetate, and N-methyl-2-pyrrolidone (NMP) solvents.

When a polyisocyanate compound and/or blocked polyisocyanate compound is used as the crosslinking agent, the catalyst used may be a common urethanation reaction catalyst. Examples of such catalysts include organometallic compounds such as tin octylate, dibutyltin diacetate, dibutyltin di(2-ethyl hexanoate), dibutyltin dilaurate, dioctyltin diacetate, dioctyltin di(2-ethyl hexanoate), dibutyltin oxide, dibutyltin sulfite, dioctyltin oxide, dibutyltin fatty acid salts, lead 2-ethylhexanoate, zinc octylate, zinc naphthenate, fatty acid zinc compounds, bismuth octanoate, bismuth 2-ethylhexanoate, bismuth oleate, bismuth neodecanoate, bismuth versatate, bismuth naphthenate, cobalt naphthenate, calcium octylate, copper naphthenate and tetra(2-ethylhexyl)titanate; and tertiary amines, any of which may be used alone or in combinations of two or more.

When a catalyst is used, the catalyst amount is preferably in the range of 0.0001 to 1 mass % and especially 0.0005 to 0.5 mass %, with respect to the total solid content of the polymer composition.

When the polymer composition contains the catalyst, the polymer composition may contain an organic acid such as acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, laurylic acid, palmitic acid, stearic acid, oleic acid, linolic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride or phthalic anhydride; an inorganic acid such as hydrochloric acid or phosphoric acid; or a metal coordinating compound such as acetylacetone or an imidazole-based compound, from the viewpoint of storage stability and curability.

The amino resin used may be a partially methylolated amino resin or totally methylolated amino resin, obtained by reacting an amino component and an aldehyde component. Examples of amino components include melamine, urea, benzoguanamine, acetoguanamine, steroguanamine, spiroguanamine and dicyandiamide. Aldehyde components include formaldehyde, paraformaldehyde, acetaldehyde and benzaldehyde.

Also, the methylol groups in the methylolated amino resin may be partially or completely etherified with a suitable alcohol. Examples of alcohols to be used for the etherification include methyl alcohol, ethyl alcohol, n-propyl alcohol, isopropyl alcohol, n-butyl alcohol, isobutyl alcohol, 2-ethylbutanol and 2-ethylhexanol.

The amino resin is preferably a melamine resin. Examples of melamine resins that may be used include alkyl etherified melamine resins obtained by partial or total etherification of the methylol groups of partially or totally methylolated melamine resins, with the aforementioned alcohols.

Examples of alkyl etherified melamine resins that are suitable for use include methyl etherified melamine resins wherein the methylol groups of a partially or totally methylolated melamine resin are partially or totally etherified with methyl alcohol; butyl etherified melamine resins wherein the methylol groups of a partially or totally methylolated melamine resin are partially or totally etherified with butyl alcohol, and methyl-butyl mixed etherified melamine resins wherein the methylol groups of a partially or totally methylolated melamine resin are partially or totally etherified with methyl alcohol and butyl alcohol.

The melamine resin used may be a commercial product. Examples of trade names of commercial products include "CYMELCYMEL 202", "CYMELCYMEL 203", "CYMEL 238", "CYMEL 251", "CYMEL 303", "CYMEL 323", "CYMEL 324", "CYMEL 325", "CYMEL 327", "CYMEL 350", "CYMEL 385", "CYMEL 1156", "CYMEL 1158", "CYMEL 1116" and "CYMEL 1130" (all products of Allnex, Japan), and "U-VAN 120", "U-VAN 20HS", "U-VAN 20SE60", "U-VAN 2021", "U-VAN 2028" and "U-VAN 28-60" (all products of Mitsui Chemicals, Inc.).

The melamine resins mentioned above may be used as single ones alone or combinations of two or more different ones.

When a melamine resin is used as the crosslinking agent, a sulfonic acid such as para-toluenesulfonic acid, dodecylbenzenesulfonic acid or dinonylnaphthalenesulfonic acid; an alkylphosphoric acid ester such as monobutylphosphoric acid, dibutylphosphoric acid, mono-2-ethylhexylphosphoric acid or di-2-ethylhexylphosphoric acid; or a salt of these acids with an amine compound, may be used as the catalyst.

The polymer composition containing a modified chlorinated polyolefin according to the invention, obtained by copolymerizing a chlorinated polyolefin that has an allyloxy group (b), and a polymerizable monomer including one or more compounds (c) selected from the group consisting of (meth)acrylic acid esters, (meth)acrylic acid and styrene, in the co-presence a compound that has an allyloxy group and a hydroxyl group (a), may be suitably used as a curable composition or a coating material composition. When the polymer composition containing a modified chlorinated polyolefin of the invention is to be used as a coating material composition, it preferably contains the aforementioned hydroxyl group-reactive crosslinking agent. The coating composition may also contain various additives used in the field of coating materials, including coating resins such as epoxy resins, acrylic resins, polyester resins, urethane resins and chlorinated polyolefins, or pigments, viscosity modifiers, pigment dispersants, antifoaming agents or ultraviolet absorbers, as necessary.

The coating composition of the invention can be coated using any of various known coating methods. The object to be coated is not particularly restricted, and suitable examples include molded articles and plastic substrates such as films.

EXAMPLES

The present invention will now be explained in greater detail using production examples, examples and comparative examples. However, the invention is in no way limited by the examples. Throughout the examples, the "parts" and "%" values are based on mass, unless otherwise specified. Also, the film thicknesses of the coating films are based on the cured coating films.

Production of Polymer Composition Containing a Modified Chlorinated Polyolefin

Example 1

After placing 100 parts of "SUPERCHLON 822S" (trade name of Nippon Paper Group, Inc., maleic anhydride-modified chlorinated polyolefin, chlorine content: 24.5%), 221 parts of toluene and 0.05 part of di-t-butylhydroxytoluene (BHT) in a four-necked flask attached to a condenser tube, air was blown into the liquid phase while stirring, and the mixture was heated to about 95° C. to obtain a solution. To this there were added 57.5 parts of 2-allyloxyethanol and 0.1 part of tetrabutylammonium bromide, and stirring was continued while reacting the 2-allyloxyethanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., to obtain a solution including approximately 55 parts of 2-allyloxyethanol, as a compound that has an allyloxy group and a hydroxyl group (a), wherein the concentration of the chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 189 parts of cyclohexyl methacrylate, 10 parts of styrene, 2 parts of acrylic acid and 2 parts of ethyleneglycol dimethacrylate as one or more compounds (c) selected from among (meth) acrylic acid esters, (meth)acrylic acid and styrene, and also 5 parts of Perbutyl PV (trade name of NOF Corp., 70% hydrocarbon solution of t-butyl peroxypivalate) (3.5 parts of the active ingredient), 189.5 parts of toluene and 63 parts of butyl acetate, was added dropwise over a period of 4 hours, a liquid mixture comprising 5 parts of Perbutyl PV (3.5 parts of the active ingredient) and 70 parts of toluene was further added dropwise over a period of about 1 hour, and after continuing stirring for about 1 hour, the mixture was cooled to room temperature to obtain a polymer composition containing a modified chlorinated polyolefin (P-1). The solid content of the obtained polymer composition containing a modified chlorinated polyolefin (P-1) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 2

After placing 100 parts of "SUPERCHLON 822S" (trade name of Nippon Paper Group, Inc., maleic anhydride-modified chlorinated polyolefin, chlorine content: 24.5%), 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-allyloxyethanol and 0.1 part of tetrabutylammonium bromide, and stirring was continued while reacting the 2-allyloxyethanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 150 parts of toluene and 34.5 parts of 2-allyloxyethanol were further added to obtain a solution including approximately 55 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 191 parts of cyclohexyl methacrylate, 10 parts of styrene and 2 parts of acrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-2). The solid content of the obtained polymer composition containing a modified chlorinated polyolefin (P-2) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 3

After placing 100 parts of "SUPERCHLON 3228S" (trade name of Nippon Paper Group, Inc., maleic anhydride-modified chlorinated polyolefin, chlorine content: 28%), 210 parts of toluene, 11 parts of butyl acetate and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 57.5 parts of 2-allyloxyethanol and 0.1 part of tetrabutylammonium bromide, and stirring was continued while reacting the 2-allyloxyethanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., to obtain a solution including approximately 55 parts of 2-allyloxyethanol, as a compound that has an allyloxy group and a hydroxyl group (a), wherein the concentration of the chlorinated polyolefin with an allyloxy group (b) was approximately 27%. Next, blowing of air into the liquid phase was stopped, stirring at about 90° C. was continued while flowing nitrogen into the gas phase, a liquid mixture comprising 205 parts of methyl methacrylate, 183 parts of cyclohexyl methacrylate, 8 parts of methacrylic acid and 4 parts of ethyleneglycol dimethacrylate, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-3). The solid content of the obtained polymer composition containing a modified chlorinated polyolefin (P-3) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 4

After placing 50 parts of "HARDLEN F-6P" (trade name of Toyobo, Ltd., maleic anhydride-modified chlorinated polyolefin, chlorine content: 20%), 214 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 65 parts of 2-allyloxyethanol and 0.1 part of tetrabutylammonium bromide, and stirring was continued while reacting the 2-allyloxyethanol and acid anhydride groups. At the stage where infrared absorption analysis of the solid portion of the solution showed substantially no further change in the ratio between the absorbance at about 1770 $cm^{-1}$ and the absorbance of about 1460 $cm^{-1}$, the temperature was lowered to about 90° C., to obtain a solution including approximately 64 parts of 2-allyloxyethanol, as a compound that has an allyloxy group and a hydroxyl group (a), wherein the concentration of the chlorinated polyolefin with an allyloxy group (b) was approximately 16%. Next, blowing of air into the liquid phase was stopped, stirring at about 90° C. was continued while flowing nitrogen into the gas phase, a liquid mixture comprising 214 parts of methyl methacrylate, 222 parts of cyclohexyl methacrylate, 10 parts of styrene, 2 parts of acrylic acid and 2 parts of ethyleneglycol dimethacrylate, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-4). The solid content of the obtained polymer composition containing a modified chlorinated polyolefin (P-4) was approximately 46%, and the composition included about 52 parts of 2-allyloxyethanol. The hydroxyl value of the solid resin portion was about 12 mgKOH/g. The component ratio of the chlorinated polyolefin backbone with respect to the acrylic resin backbone having some of the 2-allyloxyethanol groups copolymerized in the composition was approximately 10/90.

Example 5

After placing 100 parts of "SUPERCHLON 822S", 221 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 82.5 parts of diethyleneglycol monoallyl ether and 0.1 part of tetrabutylammonium bromide, and stirring was continued while reacting the diethyleneglycol monoallyl ether and acid anhydride groups. At the stage where infrared absorption analysis of the solid portion of the solution showed substantially no further change in the ratio between the absorbance at about 1770 $cm^{-1}$ and the absorbance of about 1460 $cm^{-1}$, the temperature was lowered to about 90° C., to obtain a solution including approximately 79 parts of diethyleneglycol monoallyl ether, as a compound that has an allyloxy group and a hydroxyl group (a), wherein the concentration of the chlorinated polyolefin with an allyloxy group (b) was approximately 25%. Next, blowing of air into the liquid phase was stopped, stirring at about 90° C. was continued while flowing nitrogen into the gas phase, a liquid mixture comprising 187 parts of methyl methacrylate, 189 parts of cyclohexyl methacrylate, 20 parts of styrene, 2 parts of acrylic acid and 2 parts of ethyleneglycol dimethacrylate, as one or more compounds (c) selected from among (meth)acrylic acid esters, (meth)acrylic acid and styrene, and also 5 parts of Perbutyl PV, 189.5 parts of toluene and 39 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-5). The solid content of the obtained polymer composition containing a modified chlorinated polyolefin (P-5) was approximately 47%, and the composition included about 65 parts of diethyleneglycol monoallyl ether. The hydroxyl value of the solid resin portion was about 15 mgKOH/g. The component ratio of the chlorinated polyolefin backbone with respect to the acrylic resin backbone having some of the diethyleneglycol monoallyl ether groups copolymerized in the composition was approximately 19/81.

Example 6

After placing 100 parts of "SUPERCHLON 822S", 228 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 46 parts of 2-allyloxyethanol, 4 parts of butanol and 0.1 part of tetrabutylammonium bromide, and stirring was continued while reacting the 2-allyloxyethanol, butanol and acid anhydride groups. At the stage where infrared absorption analysis of the solid portion of the solution showed substantially no further change in the ratio between the absorbance at about 1770 $cm^{-1}$ and the absorbance of about 1460 $cm^{-1}$, the temperature was lowered to about 90° C., to obtain a solution including approximately 44 parts of 2-allyloxyethanol, as a compound that has an allyloxy group and a hydroxyl group (a), wherein the concentration of the chlorinated polyolefin with an allyloxy group (b) was approximately 27%. The estimated molar ratio of 2-allyloxyethanol and butanol reacted with the acid anhydride groups was 0.8/0.2. Next, blowing of air into the liquid phase was stopped, stirring at about 90° C. was continued while flowing nitrogen into the gas phase, a liquid mixture comprising 197 parts of methyl methacrylate, 189 parts of cyclohexyl methacrylate, 10 parts of styrene, 2 parts of acrylic acid and 2 parts of ethyleneglycol dimethacrylate, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-6). The solid content of the obtained polymer composition containing a modified chlorinated polyolefin (P-6) was approximately 46%, and the composition included about 36 parts of 2-allyloxyethanol. The hydroxyl value of the solid resin portion was about 9 mgKOH/g. The component ratio of the chlorinated polyolefin backbone with respect to the acrylic resin backbone having some of the 2-allyloxyethanol groups copolymerized in the composition was approximately 20/80.

Example 7

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-allyloxyethanol, 17 parts of butanol and 0.1 part of tetrabutylammonium bromide, and stirring was continued while reacting the 2-allyloxyethanol, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 140 parts of toluene and 39 parts of 2-allyloxyethanol were further added to obtain a solution including approximately 50 parts of 2-allyloxyethanol, as a compound that has an allyloxy group and a hydroxyl group (a), wherein the concentration of chlorinated polyolefin with an allyloxy group (b) was approximately 27%. The estimated molar ratio of 2-allyloxyethanol and butanol reacted with the acid anhydride groups was 0.2/0.8. Next, blowing of air into the liquid phase was stopped, stirring at about 90° C. was continued while flowing nitrogen into the gas phase, a liquid mixture comprising 206 parts of methyl methacrylate, 189 parts of cyclohexyl methacrylate, 3 parts of methacrylic acid and 2 parts of ethyleneglycol dimethacrylate, as one or more compounds (c) selected from among (meth) acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-7). The solid content of the obtained polymer composition containing a modified chlorinated polyolefin (P-7) was approximately 46%, and the composition included about 42 parts of 2-allyloxyethanol. The hydroxyl value of the solid resin portion was about 10 mgKOH/g. The component ratio of the chlorinated polyolefin backbone with respect to the acrylic resin backbone having some of the 2-allyloxyethanol groups copolymerized in the composition was approximately 20/80.

Example 8

After placing 100 parts of "SUPERCHLON 3228S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-allyloxyethanol, 16 parts of butanol, 1 part of 2-ethylhexanol and 0.1 part of tetrabutylammonium bromide, and stirring was continued while conducting reaction between the 2-allyloxyethanol, butanol, 2-ethylhexanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 140 parts of toluene and 39 parts of 2-allyloxyethanol were further added to obtain a solution including approximately 50 parts of 2-allyloxyethanol, as a compound that has an allyloxy group and a hydroxyl group (a), wherein the concentration of chlorinated polyolefin with an allyloxy group (b) was approximately 27%. The estimated molar ratio of 2-allyloxyethanol and other alcohols that reacted with the acid anhydride groups was 0.2/0.8. Next, blowing of air into the liquid phase was stopped, stirring at about 90° C. was continued while flowing nitrogen into the gas phase, a liquid mixture comprising 206 parts of methyl methacrylate, 180 parts of cyclohexyl methacrylate, 10 parts of styrene, 2 parts of acrylic acid and 2 parts of ethyleneglycol dimethacrylate, as one or more compounds (c) selected from among (meth) acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-8). The solid content of the obtained polymer composition containing a modified chlorinated polyolefin (P-8) was approximately 46%, and the composition included about 41 parts of 2-allyloxyethanol. The hydroxyl value of the solid resin portion was about 10 mgKOH/g. The component ratio of the chlorinated polyolefin backbone with respect to the acrylic resin backbone having some of the 2-allyloxyethanol groups copolymerized in the composition was approximately 20/80.

Example 9

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-allyloxyethanol, 1 part of 4-hydroxybutyl acrylate and 0.1 part of tetrabutylammonium bromide, and stirring was continued while reacting the 2-allyloxyethanol, 4-hydroxybutyl acrylate and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 156 parts of toluene and 39 parts of 2-allyloxyethanol were further added to obtain a solution including approximately 48 parts of 2-allyloxyethanol, as a compound that has an allyloxy group and a hydroxyl group (a), wherein the concentration of chlorinated polyolefin with an allyloxy group (b) was approximately 27%. The estimated molar ratio of 2-allyloxyethanol and 4-hydroxybutyl acrylate reacted with the acid anhydride groups was 0.9/0.1. Next, blowing of air into the liquid phase was stopped, stirring at about 90° C. was continued while flowing nitrogen into the gas phase, a liquid mixture comprising 303 parts of methyl methacrylate, 96 parts of cyclohexyl methacrylate and 1 part of acrylic acid, as one or more compounds (c) selected from among (meth) acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-9). The solid content of the obtained polymer composition containing a modified chlorinated polyolefin (P-9) was approximately 46%, and the composition included about 39 parts of 2-allyloxyethanol. The hydroxyl value of the solid resin portion was about 10 mgKOH/g. The component ratio of the chlorinated polyolefin backbone with respect to the acrylic resin backbone having some of the 2-allyloxyethanol groups copolymerized in the composition was approximately 20/80.

Example 10

After placing 50 parts of "HARDLEN F-6P", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 1.3 parts of 2-allyloxyethanol, 3 parts of 2-hydroxyethyl methacrylate, 4 parts of butanol and 0.1 part of tetrabutylammonium bromide, and stirring was continued while reacting the 2-allyloxyethanol, 2-hydroxyethyl methacrylate, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 140 parts of toluene and 60 parts of 2-allyloxyethanol were further added to obtain a solution including approximately 61 parts of 2-allyloxyethanol, as a compound that has an allyloxy group and a hydroxyl group (a), wherein the concentration of chlorinated polyolefin with an allyloxy group (b) was approximately 16%. The estimated molar ratio of 2-allyloxyethanol, 2-hydroxyethyl methacrylate and butanol reacted with the acid anhydride groups was 0.1/0.1/0.8. Next, blowing of air into the liquid phase was stopped, stirring at about 90° C. was continued while flowing nitrogen into the gas phase, a liquid mixture comprising 90 parts of methyl methacrylate, 352 parts of cyclohexyl methacrylate, 5 parts of styrene and 3 parts of acrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-10). The solid content of the obtained polymer composition containing a modified chlorinated polyolefin (P-10) was approximately 46%, and the composition included about 49 parts of 2-allyloxyethanol. The hydroxyl value of the solid resin portion was about 14 mgKOH/g. The component ratio of the chlorinated polyolefin backbone with respect to the acrylic resin backbone having some of the 2-allyloxyethanol groups copolymerized in the composition was approximately 10/90.

Example 11

After placing 100 parts of "SUPERCHLON 3228S", 221 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 40 parts of 2-allyloxyethanol, 15 parts of butanol and 0.1 part of tetrabutylammonium bromide, and stirring was continued while reacting the 2-allyloxyethanol, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., to obtain a solution including approximately 39 parts of 2-allyloxyethanol, as a compound that has an allyloxy group and a hydroxyl group (a), wherein the concentration of the chlorinated polyolefin with an allyloxy group (b) was approximately 27%. The estimated molar ratio of 2-allyloxyethanol and butanol reacted with the acid anhydride groups was 0.5/0.5. Next, blowing of air into the liquid phase was stopped, stirring at about 90° C. was continued while flowing nitrogen into the gas phase, a liquid mixture comprising 162 parts of methyl methacrylate, 56 parts of n-butyl acrylate, 144 parts of isobornyl acrylate, 36 parts of 2-hydroxyethyl acrylate and 2 parts of ethyleneglycol dimethacrylate, as one or more compounds (c) selected from among (meth)acrylic acid esters, (meth)acrylic acid and styrene, and also 5 parts of Perbutyl PV, 189.5 parts of toluene, 30 parts of butyl acetate and 33 parts of butanol, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-11). The solid content of the obtained polymer composition containing a modified chlorinated polyolefin (P-11) was approximately 46%, and the composition included about 32 parts of 2-allyloxyethanol. The hydroxyl value of the solid resin portion was about 42 mgKOH/g. The component ratio of the chlorinated polyolefin backbone with respect to the acrylic resin backbone having some of the 2-allyloxyethanol groups copolymerized in the composition was approximately 20/80.

Example 12

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 30 parts of 2-allyloxyethanol and 0.1 part of tetrabutylammonium bromide, and stirring was continued while reacting the 2-allyloxyethanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 178 parts of toluene was further added to obtain a solution including approximately 28 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 303 parts of cyclohexyl methacrylate, 84 parts of n-butyl acrylate, 10 parts of 2-hydroxyethyl acrylate and 3 parts of methacrylic acid, as one or more compounds (c) selected from among (meth)acrylic acid esters, (meth)acrylic acid and styrene, and also 5 parts of Perbutyl PV, 189.5 parts of toluene, 45 parts of butyl acetate and 18 parts of butanol, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-12). The solid content of the obtained polymer composition containing a modified chlorinated polyolefin (P-12) was approximately 46%, and the composition included about 23 parts of 2-allyloxyethanol. The hydroxyl value of the solid resin portion was about 15 mgKOH/g. The component ratio of the chlorinated polyolefin backbone with respect to the acrylic resin backbone having some of the 2-allyloxyethanol groups copolymerized in the composition was approximately 20/80.

Example 13

After placing 100 parts of "HARDLEN F-6P", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-allyloxyethanol, 3 parts of 2-hydroxyethyl methacrylate and 0.1 part of tetrabutylammonium bromide, and stirring was continued while reacting the 2-allyloxyethanol, 2-hydroxyethyl methacrylate and acid anhydride groups. At the stage where infrared absorption analysis of the solid portion of the solution showed substantially no further change in the ratio between the absorbance at about 1770 $cm^{-1}$ and the absorbance of about 1460 $cm^{-1}$, the temperature was lowered to about 90° C., and then 193 parts of toluene was further added to obtain a solution including approximately 9 parts of 2-allyloxyethanol, as a compound that has an allyloxy group and a hydroxyl group (a), wherein the concentration of chlorinated polyolefin with an allyloxy group (b) was approximately 27%. The estimated molar ratio of 2-allyloxyethanol and 2-hydroxyethyl methacrylate reacted with the acid anhydride groups was 0.9/0.1. Next, blowing of air into the liquid phase was stopped, stirring at about 90° C. was continued while flowing nitrogen into the gas phase, a liquid mixture comprising 175 parts of methyl methacrylate, 195 parts of cyclohexyl methacrylate, 26 parts of 2-hydroxyethyl methacrylate and 4 parts of acrylic acid, as one or more compounds (c) selected from among (meth)acrylic acid esters, (meth)acrylic acid and styrene, and also 5 parts of Perbutyl PV, 189.5 parts of toluene, 33 parts of butyl acetate and 30 parts of butanol, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-13). The solid content of the obtained polymer composition containing a modified chlorinated polyolefin (P-13) was approximately 45%, and the composition included about 8 parts of 2-allyloxyethanol. The hydroxyl value of the solid resin portion was about 26 mgKOH/g. The component ratio of the chlorinated polyolefin backbone with respect to the acrylic resin backbone having some of the 2-allyloxyethanol groups copolymerized in the composition was approximately 20/80.

Example 14

After placing 150 parts of "SUPERCHLON 822S", 105 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 18 parts of 2-allyloxyethanol, 3 parts of butanol and 0.1 part of tetrabutylammonium bromide, and stirring was continued while reacting the 2-allyloxyethanol, butanol and acid anhydride groups. At the stage where infrared absorption analysis of the solid portion of the solution showed substantially no further change in the ratio between the absorbance at about 1770 $cm^{-1}$ and the absorbance of about 1460 $cm^{-1}$, the temperature was lowered to about 90° C., and then 255 parts of toluene was further added to obtain a solution including approximately 14 parts of 2-allyloxyethanol, as a compound that has an allyloxy group and a hydroxyl group (a), wherein the concentration of chlorinated polyolefin with an allyloxy group (b) was approximately 29%. The estimated molar ratio of 2-allyloxyethanol and butanol reacted with the acid anhydride groups was 0.7/0.3. Next, blowing of air into the liquid phase was stopped, stirring at about 90° C. was continued while flowing nitrogen into the gas phase, a liquid mixture comprising 250 parts of cyclohexyl methacrylate, 48 parts of isobornyl acrylate, 22 parts of 2-hydroxyethyl methacrylate and 30 parts of styrene, as one or more compounds (c) selected from among (meth)acrylic acid esters, (meth)acrylic acid and styrene, and also 5 parts of Perbutyl PV, 82.5 parts of toluene, 38 parts of butyl acetate and 27 parts of butanol, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-14). The solid content of the obtained polymer composition containing a modified chlorinated polyolefin (P-14) was approximately 45%, and the composition included about 12 parts of 2-allyloxyethanol. The hydroxyl value of the solid resin portion was about 22 mgKOH/g. The component ratio of the chlorinated polyolefin backbone with respect to the acrylic resin backbone having some of the 2-allyloxyethanol groups copolymerized in the composition was approximately 30/70.

Example 15

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-allyloxyethanol and 0.1 part of tetrabutylammonium bromide, and reaction between the 2-allyloxyethanol and acid anhydride groups was conducted while continuing to stir. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 150 parts of toluene and 34.5 parts of 2-allyloxyethanol were further added to obtain a solution including approximately 55 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 191 parts of cyclohexyl methacrylate, 10 parts of styrene and 2 parts of acrylic acid, as one or more compounds (c) selected from among (meth)acrylic acid esters, (meth)acrylic acid and styrene, and also 12 parts of PERHEXA 25O (trade name of NOF Corp., 50% hydrocarbon solution of 2,5-dimethyl-2,5-di(2-ethylhexanoylperoxy)hexane) (6 parts of active ingredient), 189.5 parts of toluene and 63 parts of butyl acetate, was added dropwise over a period of 4 hours, a liquid mixture comprising 6 parts of PERHEXA 25O and 70 parts of toluene was further added dropwise over a period of about 1 hour, and after continuing stirring for about 1 hour, the mixture was cooled to room temperature to obtain a polymer composition containing a modified chlorinated polyolefin (P-15). The solid content of the obtained polymer composition containing a modified chlorinated polyolefin (P-15) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 16

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-allyloxyethanol and 0.1 part of tetrabutylammonium bromide, and reaction between the 2-allyloxyethanol and acid anhydride groups was conducted while continuing to stir. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 150 parts of toluene and 34.5 parts of 2-allyloxyethanol were further added to obtain a solution including approximately 55 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 191 parts of cyclohexyl methacrylate, 10 parts of styrene and 2 parts of acrylic acid, as one or more compounds (c) selected from among (meth)acrylic acid esters, (meth)acrylic acid and styrene, and also 5 parts of V-65 (trade name of Wako Pure Chemical Industries, Ltd., azobis(2,4-dimethylvaleronitrile)), 189.5 parts of toluene and 63 parts of butyl acetate, was added dropwise over a period of 4 hours, a liquid mixture comprising 5 parts of Perbutyl PV and 70 parts of toluene was further added dropwise over a period of about 1 hour, and after continuing stirring for about 1 hour, the mixture was cooled to room temperature to obtain a polymer composition containing a modified chlorinated polyolefin (P-16). The solid content of the obtained polymer composition containing a modified chlorinated polyolefin (P-16) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 17

After placing 100 parts of "SUPERCHLON 822S", 67 parts of toluene, 3 parts of methylcyclohexane and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-allyloxyethanol and 0.1 part of tetrabutylammonium bromide, and reaction between the 2-allyloxyethanol and acid anhydride groups was conducted while continuing to stir. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 145 parts of toluene, 5 parts of methylcyclohexane and 34.5 parts of 2-allyloxyethanol were further added to obtain a solution including approximately 55 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 191 parts of cyclohexyl methacrylate, 10 parts of styrene and 2 parts of acrylic acid, as one or more compounds (c) selected from among (meth)acrylic acid esters, (meth)acrylic acid and styrene, and also 5 parts of Perbutyl PV, 171.5 parts of toluene, 18 parts of methylcyclohexane and 63 parts of butyl acetate, was added dropwise over a period of 4 hours, a liquid mixture comprising 5 parts of Perbutyl PV, 63 parts of toluene and 7 parts of methylcyclohexane was further added dropwise over a period of about 1 hour, and after continuing stirring for about 1 hour, the mixture was cooled to room temperature to obtain a polymer composition containing a modified chlorinated polyolefin (P-17). The solid content of the obtained polymer composition containing a modified chlorinated polyolefin (P-17) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Example 18

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-allyloxyethanol and 0.1 part of tetrabutylammonium bromide, and reaction between the 2-allyloxyethanol and acid anhydride groups was conducted while continuing to stir. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 150 parts of toluene and 34.5 parts of 2-allyloxyethanol were further added to obtain a solution including approximately 55 parts of 2-allyloxyethanol, as a compound that has an allyloxy group and a hydroxyl group (a), wherein the concentration of chlorinated polyolefin with an allyloxy group (b) was approximately 27%. Next, blowing of air into the liquid phase was stopped, stirring at about 90° C. was continued while flowing nitrogen into the gas phase, a liquid mixture comprising 197 parts of methyl methacrylate, 191 parts of cyclohexyl methacrylate, 10 parts of styrene and 2 parts of acrylic acid, as one or more compounds (c) selected from among (meth)acrylic acid esters, (meth)acrylic acid and styrene, and also 5 parts of Perbutyl PV, 171.5 parts of toluene, 9 parts of cyclohexane, 9 parts of methylcyclohexane and 63 parts of butyl acetate, was added dropwise over a period of 4 hours, a liquid mixture comprising 5 parts of Perbutyl PV, 63 parts of toluene, 3 parts of cyclohexane and 4 parts of methylcyclohexane was further added dropwise over a period of about 1 hour, and after continuing stirring for about 1 hour, the mixture was cooled to room temperature to obtain a polymer composition containing a modified chlorinated polyolefin (P-18). The solid content of the obtained polymer composition containing a modified chlorinated polyolefin (P-18) was approximately 46%, and the composition included about 45 parts of 2-allyloxyethanol. The hydroxyl value of the solid resin portion was about 11 mgKOH/g. The component ratio of the chlorinated polyolefin backbone with respect to the acrylic resin backbone having some of the 2-allyloxyethanol groups copolymerized in the composition was approximately 20/80.

Comparative Example 1

After placing 100 parts of "SUPERCHLON 822S", 221 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 57.5 parts of 2-hydroxyethyl methacrylate and 0.1 part of tetrabutylammonium bromide, and stirring was continued while reacting the 2-hydroxyethyl methacrylate and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., to obtain a solution, wherein the concentration of the chlorinated polyolefin (b) without allyloxy groups was approximately 27%. Next, blowing of air into the liquid phase was stopped, stirring at about 90° C. was continued while flowing nitrogen into the gas phase, a liquid mixture comprising 197 parts of methyl methacrylate, 189 parts of cyclohexyl methacrylate, 10 parts of styrene, 2 parts of ethyleneglycol dimethacrylate and 2 parts of acrylic acid, as one or more compounds (c) selected from among (meth) acrylic acid esters, (meth)acrylic acid and styrene, and also 5 parts of Perbutyl PV, 189.5 parts of toluene and 63 parts of butyl acetate, was added dropwise, but because the reaction system gelled about 1 hour after start of the dropwise addition, production of the polymer composition containing a modified chlorinated polyolefin was terminated.

Comparative Example 2

After placing 100 parts of "SUPERCHLON 3228S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 23 parts of 2-hydroxyethyl methacrylate and 0.1 part of tetrabutylammonium bromide, and stirring was continued while reacting the 23 parts of 2-hydroxyethyl methacrylate and acid anhydride groups. Due to sudden heat release and polymerization after about 40 minutes, production of the polymer composition containing a modified chlorinated polyolefin was terminated.

Comparative Example 3

After placing 100 parts of "SUPERCHLON 822S", 218 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 57.5 parts of 2-hydroxyethyl methacrylate, 2 parts of butanol and 0.1 part of tetrabutylammonium bromide, and stirring was continued while reacting the 2-hydroxyethyl methacrylate, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., to obtain a solution wherein the concentration of the chlorinated polyolefin (b) without allyloxy groups was approximately 27%. The estimated molar ratio of 2-hydroxyethyl methacrylate and butanol reacted with the acid anhydride groups was 0.8/0.2. Next, blowing of air into the liquid phase was stopped, stirring at about 90° C. was continued while flowing nitrogen into the gas phase, a liquid mixture comprising 197 parts of methyl methacrylate, 186 parts of cyclohexyl methacrylate, 6 parts of 2-hydroxyethyl acrylate, 10 parts of styrene and 1 part of acrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise, but because the reaction system gelled about 1 hour after start of the dropwise addition, production of the polymer composition containing a modified chlorinated polyolefin was terminated.

Comparative Example 4

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-hydroxyethyl methacrylate, 17 parts of butanol and 0.1 part of tetrabutylammonium bromide, and stirring was continued while reacting the 2-hydroxyethyl methacrylate, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 180 parts of toluene was further added to obtain a solution wherein the concentration of chlorinated polyolefin (b) without allyloxy groups was approximately 27%. The estimated molar ratio of 2-hydroxyethyl methacrylate and butanol reacted with the acid anhydride groups was 0.1/0.9. Next, blowing of air into the liquid phase was stopped, stirring at about 90° C. was continued while flowing nitrogen into the gas phase, a liquid mixture comprising 197 parts of methyl methacrylate, 189 parts of cyclohexyl methacrylate, 2 parts of ethyleneglycol dimethacrylate, 10 parts of styrene and 2 parts of acrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was added dropwise over a period of about 1 hour, and after continuing stirring for about 1 hour, the mixture was cooled to room temperature to obtain a polymer composition containing a modified chlorinated polyolefin (P-22). The solid content of the obtained polymer composition containing a modified chlorinated polyolefin (P-22) was approximately 46%, and the hydroxyl value of the solid resin portion was about 9 mgKOH/g. The component ratio of the chlorinated polyolefin backbone and the acrylic resin backbone in the composition was approximately 20/80.

Comparative Example 5

After placing 100 parts of "SUPERCHLON 822S", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-hydroxyethyl methacrylate, 17 parts of butanol and 0.1 part of tetrabutylammonium bromide, and stirring was continued while reacting the 2-hydroxyethyl methacrylate, butanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 172 parts of toluene and 6.8 parts of 2-hydroxyethyl methacrylate were further added to obtain a solution wherein the concentration of chlorinated polyolefin (b) without allyloxy groups was approximately 27%. The estimated molar ratio of 2-hydroxyethyl methacrylate and butanol reacted with the acid anhydride groups was 0.1/0.9. Next, blowing of air into the liquid phase was stopped, stirring at about 90° C. was continued while flowing nitrogen into the gas phase, a liquid mixture comprising 206 parts of methyl methacrylate, 189 parts of cyclohexyl methacrylate, 2 parts of ethyleneglycol dimethacrylate and 3 parts of methacrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was added dropwise over a period of about 1 hour, and after continuing stirring for about 1 hour, the mixture was cooled to room temperature to obtain a polymer composition containing a modified chlorinated polyolefin (P-23). The solid content of the obtained polymer composition containing a modified chlorinated polyolefin (P-23) was approximately 46%, and the hydroxyl value of the solid resin portion was about 15 mgKOH/g. The component ratio of the chlorinated polyolefin backbone and the acrylic resin backbone in the composition was approximately 20/80.

Comparative Example 6

After placing 50 parts of "HARDLEN F-6P", 70 parts of toluene and 0.05 part of di-t-butylhydroxytoluene (BHT) in a four-necked flask attached to a condenser tube, air was blown into the liquid phase while stirring, and the mixture was heated at about 95° C. to obtain a solution. To this there were added 11.5 parts of 2-hydroxyethyl methacrylate, 16 parts of butanol, 1 part of 2-ethylhexanol and 0.1 part of tetrabutylammonium bromide, and stirring was continued while reacting the 2-hydroxyethyl methacrylate, butanol, 2-ethylhexanol and acid anhydride groups. At the stage where infrared absorption analysis of the solid portion of the solution showed substantially no further change in the ratio between the absorbance at about 1770 cm$^{-1}$ and the absorbance of about 1460 cm$^{-1}$, the temperature was lowered to about 90° C., and then 180 parts of toluene was further added to obtain a solution wherein the concentration of chlorinated polyolefin (b) without allyloxy groups was approximately 16%. The estimated molar ratio of 2-hydroxyethyl methacrylate and other alcohols reacted with the acid anhydride groups was 0.1/0.9. Next, blowing of air into the liquid phase was stopped, stirring at about 90° C. was continued while flowing nitrogen into the gas phase, a liquid mixture comprising 214 parts of methyl methacrylate, 222 parts of cyclohexyl methacrylate, 10 parts of styrene, 2 parts of ethyleneglycol dimethacrylate and 2 parts of acrylic acid, as one or more compounds (c) selected from among (meth)acrylic acid esters, (meth)acrylic acid and styrene, and also 5 parts of Perbutyl PV, 189.5 parts of toluene and 63 parts of butyl acetate, was added dropwise over a period of 4 hours, a liquid mixture comprising 5 parts of Perbutyl PV and 70 parts of toluene was added dropwise over a period of about 1 hour, and after continuing stirring for about 1 hour, the mixture was cooled to room temperature to obtain a polymer composition containing a modified chlorinated polyolefin (P-24). The solid content of the obtained polymer composition containing a modified chlorinated polyolefin (P-24) was approximately 46%, and the hydroxyl value of the solid resin portion was about 9 mgKOH/g. The component ratio of the chlorinated polyolefin backbone and the acrylic resin backbone in the composition was approximately 10/90.

Production of Coating Composition

Example 19

To a composition comprising a uniform mixture of 100 parts of the polymer composition containing a modified chlorinated polyolefin (P-1) obtained in Example 1 and 3.2 parts of "SUMIDUR N3300" (trade name of Sumika Covestro Urethane Co., Ltd., isocyanurate of hexamethylene diisocyanate, solid content: 100%, isocyanate content: 21.6 wt %) there was added 0.15 part of dibutyltin dilaurate as a catalyst, and then toluene and butyl acetate were further added to adjust the viscosity, obtaining coating composition No. 1 having a viscosity of about 30 seconds with a Ford cup No. 4 at 20° C. The equivalent ratio of isocyanate groups in the "SUMIDUR N3300" and hydroxyl groups in the resin component of the polymer composition containing a modified chlorinated polyolefin (P-1) (NCO/OH) was approximately 1.8.

Examples 20 to 36 and Comparative Examples 7 to 12

Coating compositions No. 2 to 24, each having a viscosity of 30 seconds with a Ford cup No. 4 at 20° C., were obtained in the same manner as Example 19, except that the composition of the polymer composition containing a modified chlorinated polyolefin and the polyisocyanate compound in Example 19 was as listed in Table 1. In Comparative Examples 7 to 9 it was not possible to produce polymer compositions containing modified chlorinated polyolefins ("P-19" to "P-21") as starting materials, and therefore coating compositions were not produced.

Each of the obtained coating compositions was evaluated by the following test methods. The evaluation results are shown with the coating compositions in Table 1.

TABLE 1

| | | Coating material composition | Polymer composition containing modified chlorinated polyolefin | | Polyisocyanate compound SUMIDUR N3300 | NCO/ | Evaluation results | |
|---|---|---|---|---|---|---|---|---|
| | | | | | | | Production stability | Curability |
| | | Name | Name | Content | | OH | | |
| Example | 19 | No. 1 | P-1 | 100 | 3.2 | 1.8 | G | A |
| | 20 | No. 2 | P-2 | 100 | 3.2 | 1.8 | G | A |
| | 21 | No. 3 | P-3 | 100 | 3.2 | 1.8 | G | A |
| | 22 | No. 4 | P-4 | 100 | 3.4 | 1.8 | G | A |
| | 23 | No. 5 | P-5 | 100 | 4.4 | 1.8 | G | A |
| | 24 | No. 6 | P-6 | 100 | 2.6 | 1.8 | G | A |
| | 25 | No. 7 | P-7 | 100 | 2.9 | 1.8 | G | A |
| | 26 | No. 8 | P-8 | 100 | 2.9 | 1.8 | G | A |
| | 27 | No. 9 | P-9 | 100 | 2.9 | 1.8 | G | A |
| | 28 | No. 10 | P-10 | 100 | 4.0 | 1.8 | G | A |
| | 29 | No. 11 | P-11 | 100 | 12.1 | 1.8 | G | A |
| | 30 | No. 12 | P-12 | 100 | 4.3 | 1.8 | G | A |
| | 31 | No. 13 | P-13 | 100 | 7.3 | 1.8 | G | A |
| | 32 | No. 14 | P-14 | 100 | 6.3 | 1.8 | G | B |
| | 33 | No. 15 | P-15 | 100 | 3.2 | 1.8 | G | A |
| | 34 | No. 16 | P-16 | 100 | 3.2 | 1.8 | G | A |
| | 35 | No. 17 | P-17 | 100 | 3.2 | 1.8 | G | A |
| | 36 | No. 18 | P-18 | 100 | 3.2 | 1.8 | G | A |
| Comp. Example | 7 | No. 19 | P-19 | — | — | — | P | — |
| | 8 | No. 20 | P-20 | — | — | — | P | — |
| | 9 | No. 21 | P-21 | — | — | — | P | — |
| | 10 | No. 22 | P-22 | 100 | 2.6 | 1.8 | G | E |
| | 11 | No. 23 | P-23 | 100 | 4.3 | 1.8 | G | D |
| | 12 | No. 24 | P-24 | 100 | 2.6 | 1.8 | G | E |

Test Methods

Production stability: G was assigned when a polymer composition containing a modified chlorinated polyolefin could be produced, and P was assigned when it could not be produced.

Curability (gel fraction): Each coating composition is coated onto a glass plate to a dry film thickness of 40 μm and subjected to heat drying at 90° C. for 30 minutes. The coating film on the glass plate is then collected and the mass (Wa) is measured. The coating film is placed in a 200 mesh stainless steel mesh-like container, and extracted while circulating for 1 hour in acetone heated to about 56° C., and after drying at 100° C. for 1 hour, the coating film mass (Wb) is measured and the insoluble coating film residue rate (mass %) calculated from the following formula is recorded as the gel fraction and used as the basis to evaluate the curability.

Gel fraction (mass %)=(Wb/Wa)×100

A: Gel fraction of 70%
B: Gel fraction of 60% and <70%
C: Gel fraction of 50% and <60%
D: Gel fraction of 30% and <50%
E: Gel fraction of <30%

The invention claimed is:

1. A method for producing a polymer composition containing a modified chlorinated polyolefin, the method including a step of copolymerizing a chlorinated polyolefin that has an allyloxy group (b), and a polymerizable monomer including one or more compounds (c) selected from the group consisting of (meth)acrylic acid esters, (meth)acrylic acid and styrene, in the co-presence of a compound that has an allyloxy group and a hydroxyl group (a), to obtain a modified chlorinated polyolefin, wherein the compound that has an allyloxy group and a hydroxyl group (a) is a compound represented by the following formula (I):

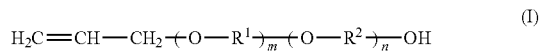

wherein $R^1$ and $R^2$ each independently represent an alkylene group of 2 or 3 carbon atoms that is optionally branched, m and n each independently represent a real number of 0 to 50, the sum of m and n being a real number of 1 or greater, and the structure may be a block structure or random structure.

2. The method according to claim 1, wherein the chlorinated polyolefin that has an allyloxy group (b) is obtained by addition reaction of a chlorinated polyolefin that has an acid anhydride group (d) and a compound that has an allyloxy group and a hydroxyl group (a) represented by formula (I).

3. The method according to claim 1, wherein the compound that has an allyloxy group and a hydroxyl group (a) is an allyloxyethanol.

4. A polymer composition containing a modified chlorinated polyolefin, which is obtained by copolymerizing a chlorinated polyolefin that has an allyloxy group (b), and a polymerizable monomer including one or more compounds (c) selected from the group consisting of (meth)acrylic acid esters, (meth)acrylic acid and styrene, in the co-presence of a compound that has an allyloxy group and a hydroxyl group (a), wherein the compound that has an allyloxy group and a hydroxyl group (a) is a compound represented by the following formula (I):

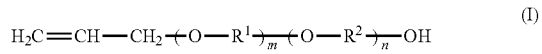

wherein $R^1$ and $R^2$ each independently represent an alkylene group of 2 or 3 carbon atoms that is optionally branched, m and n each independently represent a real number of 0 to 50, the sum of m and n being a real number of 1 or greater, and the structure may be a block structure or random structure.

5. A curable composition that includes a polymer composition according to claim 4 and a hydroxyl group-reactive crosslinking agent.

6. A coating composition that includes a polymer composition according to claim 4.

7. The coating composition according to claim 6, which further includes a hydroxyl group-reactive crosslinking agent.

* * * * *